(12) United States Patent
Chen et al.

(10) Patent No.: US 7,805,674 B2
(45) Date of Patent: Sep. 28, 2010

(54) SYSTEM FOR CONTROLLING THE DISPLAY SIZE OF A FORMULA BAR IN A SPREADSHEET

(75) Inventors: Bo Chen, Zhuhai (CN); Hui Wang, Zhuhai (CN); Qingyuan Zhang, Zhuhai (CN); Li Wan, Zhuhai (CN)

(73) Assignee: Zhuhai Kingsoft Software Co., Ltd., Zhuhai, Guangdong (CN)

( * ) Notice: Subject to any disclaimer, the term of this patent is extended or adjusted under 35 U.S.C. 154(b) by 1036 days.

(21) Appl. No.: 11/479,116

(22) Filed: Jun. 29, 2006

(65) Prior Publication Data
US 2007/0016850 A1  Jan. 18, 2007

(30) Foreign Application Priority Data
Jun. 29, 2005  (CN) .......................... 2005 1 0035475

(51) Int. Cl.
*G06F 17/00* (2006.01)
(52) U.S. Cl. ...................... 715/267; 715/212
(58) Field of Classification Search ................ 715/212, 715/217, 220, 219, 213, 267
See application file for complete search history.

(56) References Cited

U.S. PATENT DOCUMENTS

| | | | | |
|---|---|---|---|---|
| 5,375,201 A * | 12/1994 | Davoust | ...................... | 715/201 |
| 5,717,939 A * | 2/1998 | Bricklin et al. | ............. | 715/212 |
| 5,721,847 A * | 2/1998 | Johnson | ...................... | 715/786 |
| 6,771,284 B1 * | 8/2004 | Anderson et al. | ........... | 715/705 |
| 2006/0015804 A1 * | 1/2006 | Barton et al. | ................ | 715/503 |
| 2006/0069635 A1 * | 3/2006 | Ram et al. | ...................... | 705/37 |

OTHER PUBLICATIONS

Burnett, Margaret, et al, "A Scalable Method for Deductive Generalization in the Spreadsheet Paradigm", Transactions on Computer-Human Interaction (TOCHI), vol. 9, Issue 4, Dec. 2002, pp. 253-284.*

* cited by examiner

*Primary Examiner*—Laurie Ries
(74) *Attorney, Agent, or Firm*—Townsend and Townsend and Crew LLP

(57) ABSTRACT

The present invention discloses a system for controlling the display size of a formula bar in a spreadsheet. The system for controlling the display size of the formula bar and a formula bar module are parallel in a main window module of a spreadsheet application, and the system includes a sub-system I which controls the display state of the formula bar and a sub-system II which controls the display range of the specific content in the formula bar. The system continuously executes real-time detecting and measuring of the aforementioned formula bar module while the application is running, and acquires data on the size of the formula bar from the aforementioned formula bar module. If the acquired data exceed the prescribed range, then it issues a command to the aforementioned formula bar module requesting a change in the size of the formula bar. In the mean time, it issues a command to the aforementioned sub-system I and the aforementioned sub-system II.

14 Claims, 4 Drawing Sheets

SYSTEM FOR CONTROLLING THE DISPLAY SIZE OF A FORMULA BAR IN A SPREADSHEET

CROSS-REFERENCES TO RELATED APPLICATIONS

This application claims priority to Chinese Patent Application No. 200510035475.5, filed Jun. 29, 2005, commonly assigned, incorporated by reference herein for all purposes.

BACKGROUND OF THE INVENTION

The present invention relates to a system for controlling the display size of a formula bar in a spreadsheet.

The formula bar in a spreadsheet is for entering data and viewing the contents of a cell. As for the currently existing spreadsheet software, when editing a cell, if the zoom control of the editing area is relatively small or the fixed row height is set to a relatively small value, and in cases where there is a lot of content in the cell, the entire cell content will need to be viewed through the formula bar. If the content has many lines in the cell, then the open formula bar then covers up a large block of cells in the editing area, which affects the current editing task.

In the existing spreadsheet software, there has not been a system that controls the formula bar display size. Therefore, it is extremely inconvenient.

BRIEF SUMMARY OF THE INVENTION

The present invention endeavors to solve the following technical problem: that is, how to overcome the shortcomings of the existing technology in order to provide a system for controlling the display size of the formula bar in a spreadsheet. Application of this system will make operation of the spreadsheet more convenient.

The technical proposal adopted in the present invention is: a system for controlling the display size of the formula bar and a formula bar module are parallel in a main window module of a spreadsheet application, and said system for controlling the display size of the formula bar includes a sub-system I, which controls a display state of the formula bar, and a sub-system II, which controls a display range of specific contents in the formula bar; said display state refers to a shrank state or an expanded state of the formula bar; said specific contents refer to the contents currently being edited in the formula bar, and said display range refers to the display range for said specific contents; said system for controlling the display size of the formula bar continuously executing real-time detecting and measuring of said formula bar module while the application is running, and acquiring data on the size of the formula bar from said formula bar module. If the acquired data exceeds a prescribed range, then issuing a command to said formula bar module requesting a change in the size of the formula bar; in the mean time, issuing a command to said sub-system I and said sub-system II, and said sub-system I, based on the data acquired from said system for controlling the display size of the formula bar, popping up a sizing bar provided with a shrink button and an expand button which can control said display state in the formula bar and provide feedback with data on said display state to the system for controlling the display size of said formula bar; said sub-system II, based on the data acquired from said system for controlling the display size of the formula bar, popping up a scroll bar with a scroll box which may be used for controlling said display range, and providing feedback to the system for controlling the display size of the formula bar.

The beneficial effects of the present invention are: a system for controlling the display size of the formula bar and the formula bar module described in the present invention are parallel in the main window module of the spreadsheet application, and the aforementioned system for controlling the formula bar display size includes a sub-system I which controls the display state of the formula bar and a sub-system II which controls the display range of the specific contents in the formula bar; the aforementioned system for controlling the display size of the formula bar continuously executes real-time detecting and measuring of the aforementioned formula bar module while the application is running, and acquires data about the size of the formula bar from the aforementioned formula bar module. If the detected specific content (that is, the content in a cell) in the formula bar exceeds the prescribed range (for example, it exceeds a line), then the system for controlling the display size of the formula bar issues a command to the aforementioned sub-system I and the aforementioned sub-system II. The aforementioned sub-system I and the aforementioned sub-system II, based on the data acquired from the aforementioned system for controlling the display size of the formula bar, then pop up a sizing bar for controlling the aforementioned display state and a scroll bar for controlling the aforementioned display range in the formula bar. With a single click of the shrink button of the sizing bar, the display box of the formula bar is reduced to a size only displaying one line of text, and the button is automatically changed to an expand button. In the mean time, the display range of the display content of the formula bar may be selected through the scroll box of the scroll bar; with a signal click of the expand button, it expands the display box of the formula bar and displays all of the lines of the contents in the cell, and the scroll box of the scroll bar disappears. Users may use the system described in the present invention to control the display size of the formula bar by voluntarily choosing to either shrink or expand the formula bar, depending on their current spreadsheet editing needs, thereby making spreadsheet operations much more convenient.

According to yet another embodiment of the present invention, a method for displaying a content associated with a cell in a spreadsheet includes displaying a spreadsheet including at least a cell, receiving a selection of the cell, obtaining information associated with a content for the selected cell, processing information associated with the content, and displaying in a content region the content for the selected cell, the content region being associated with a region size. The content region and the selected cell are related to different physical locations, and the region size is capable of being adjusted by a user.

According to yet another embodiment of the present invention, a method for displaying a content associated with a cell in a spreadsheet includes displaying a spreadsheet including at least a cell, receiving a selection of the cell, obtaining information associated with a content for the selected cell, processing information associated with the content, and displaying in a content region the content for the selected cell. The content region is associated with a region size, and the content region and the selected cell are related to different physical locations. The displaying in a content region the content for the selected cell includes determining whether to display a first graphical indication for a user to change the region size for the content region.

According to yet anther embodiment of the present invention, a computer program product including a computer readable medium including instructions for displaying a content associated with a cell in a spreadsheet. The computer readable medium includes one or more instructions for displaying a spreadsheet including at least a cell, one or more instructions for receiving a selection of the cell, one or more instructions for obtaining information associated with a content for the selected cell, one or more instructions for processing information associated with the content, and one or more instructions for displaying in a content region the content for the selected cell. The content region is associated with a region size. The content region and the selected cell are related to different physical locations, and the region size is capable of being adjusted by a user.

According to yet another embodiment of the present invention, a computer program product including a computer readable medium including instructions for displaying a content associated with a cell in a spreadsheet. The computer readable medium includes one or more instructions for displaying a spreadsheet including at least a cell, one or more instructions for receiving a selection of the cell, one or more instructions for obtaining information associated with a content for the selected cell, one or more instructions for processing information associated with the content, and one or more instructions for displaying in a content region the content for the selected cell. The content region is associated with a region size, and the content region and the selected cell are related to different physical locations. The one or more instructions for displaying in a content region the content for the selected cell include one or more instructions for determining whether to display a first graphical indication for a user to change the region size for the content region.

Depending upon the embodiment, one or more benefits as discussed above may be achieved. These and other benefits will be described in more detail throughout the present specification and more particularly below.

Various additional objects, features and advantages of the present invention can be more fully appreciated with reference to the detailed description and the accompanying drawings that follow.

DETAILED DESCRIPTION OF THE INVENTION

Figure 1:
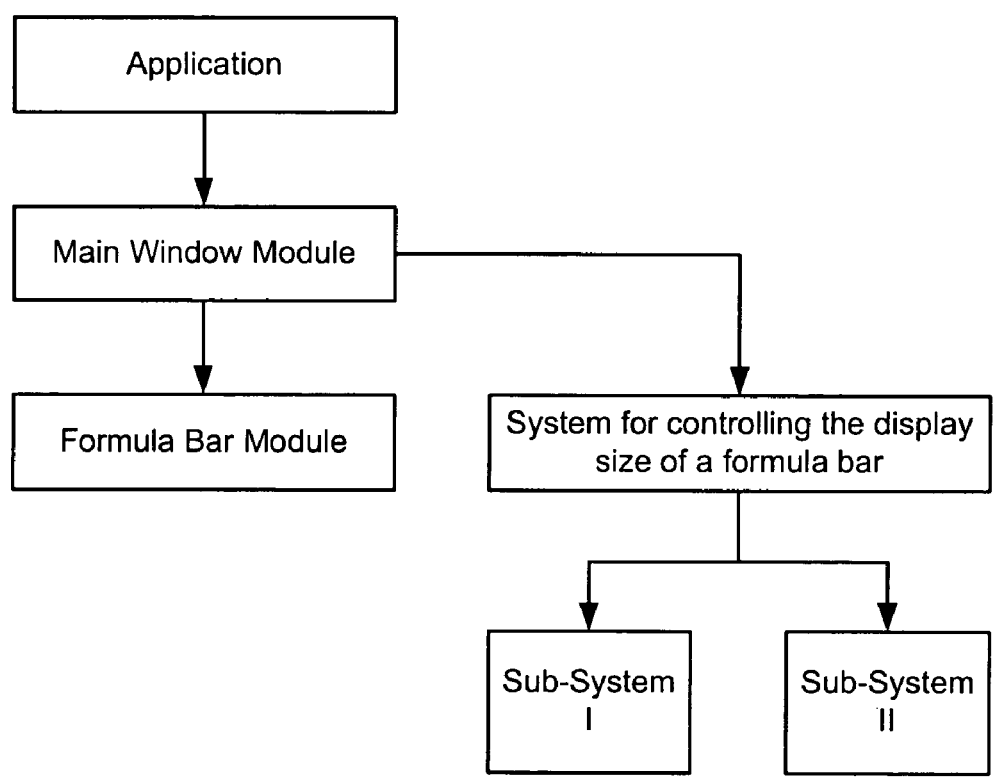
FIG. 1 is a schematic drawing showing the relationship between the modules of the spreadsheet software of the present invention.

As shown in FIG. 1, the system for controlling the display size of the formula bar of the aforementioned present invention and the formula bar module are parallel in the main window module of the spreadsheet application, and the aforementioned system for controlling the formula bar display size includes a sub-system I which controls the display state of the formula bar and a sub-system II which controls the display range of the specific contents in the formula bar. The aforementioned display state refers to the shrink state or expand state of the formula bar; the aforementioned specific content refers to the content currently being edited in the formula bar, which could be text, static and dynamic images, and multimedia objects; and the aforementioned display range refers to the display range of the aforementioned specific content.

Figure 2:
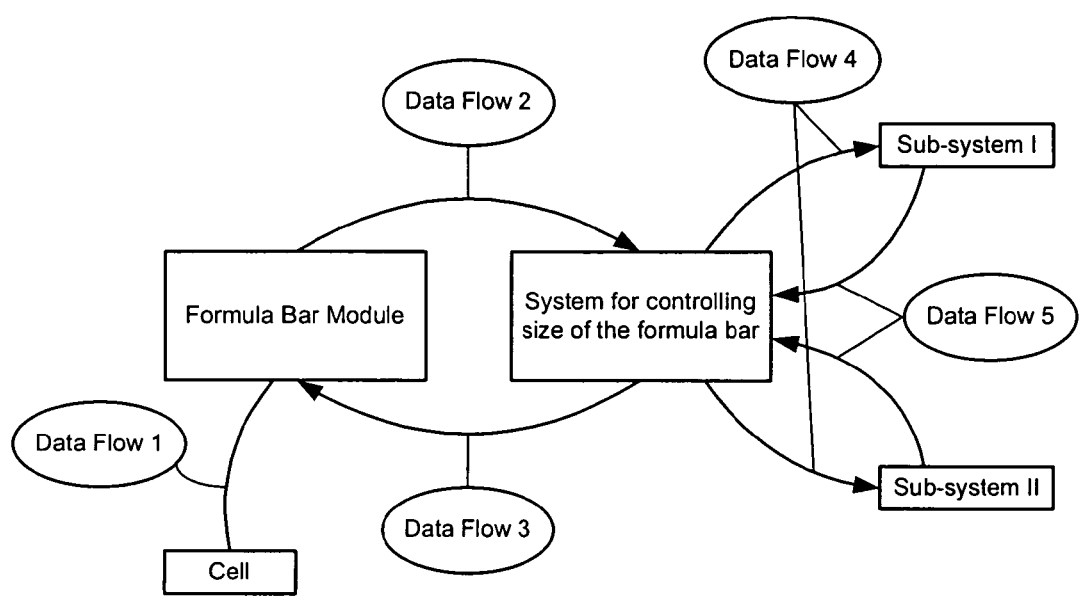
FIG. 2 is a schematic drawing showing data interaction between the system for controlling the display size of the formula bar described in the present invention and the spreadsheet.
Figure 3:
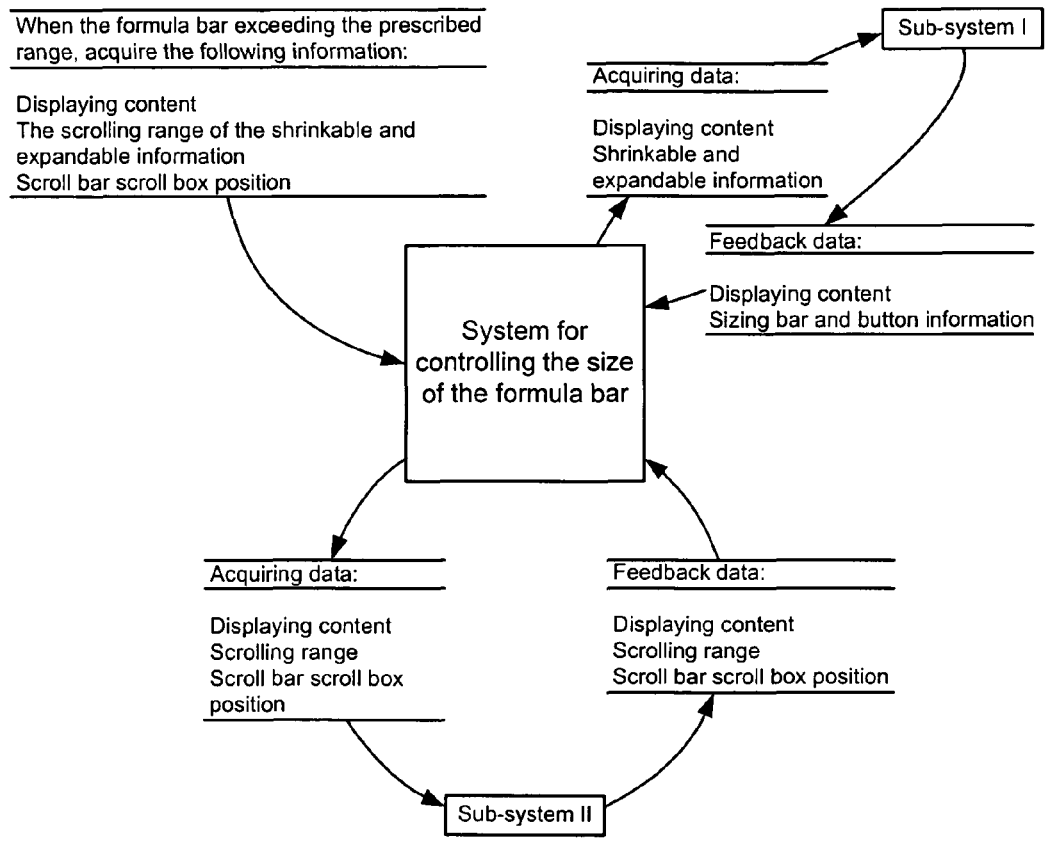
FIG. 3 is a schematic drawing showing data transmission of the system for controlling the display size of the formula bar described in the present invention.
Figure 4:
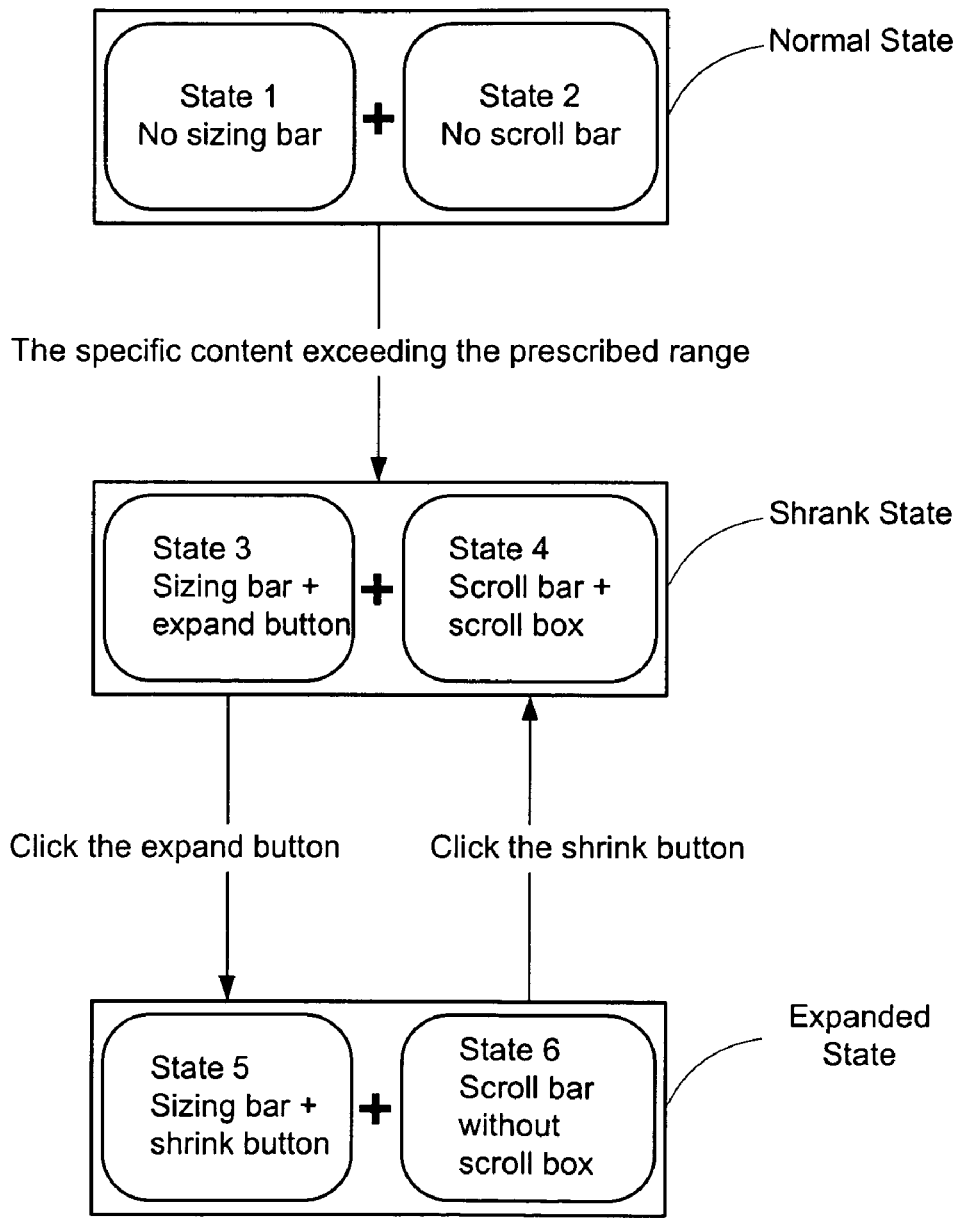
FIG. 4 is a schematic drawing showing the change of state of the formula bar under control of the system which controls the display size of the formula bar described in the present invention.

As shown in FIG. 2, FIG. 3, and FIG. 4, the formula bar module acquires the cell content from a cell when the application is running (see Data flow 1 as shown in FIG. 2); the aforementioned system for controlling the display size of the formula bar constantly executes real-time detecting and measuring of the aforementioned formula bar module; and acquires data on the size of the formula bar from the aforementioned formula bar module (see Data flow 2 as shown in FIG. 2). If the acquired data exceeds the prescribed range, the aforementioned system for controlling the display size of the formula bar issues a command to the aforementioned formula bar module requesting a change in the size of the formula bar (see Data flow 3 as shown in FIG. 2). In the meantime, it issues a command to start the aforementioned sub-system I and the aforementioned sub-system II. The aforementioned sub-system I and the aforementioned sub-system II, based on the data acquired by the aforementioned system for controlling the display size of the formula bar (see Data flow 4 as shown in FIG. 2), pops up the sizing bar provided with a shrink and expand button that can control the aforementioned display state and a scroll bar with a scroll box that can control the aforementioned display range in the formula bar, respectively, and feed back the data on the aforementioned display state and the aforementioned display range to the aforementioned system for controlling the display size of the formula bar (see Data flow 5 as shown in FIG. 2).

Under the control of the system that controls the display size of the formula bar, the details of the display state of the formula bar are as follows:

When the specific content (for example, the text) placed in the formula bar has not exceeded the prescribed range (for example, one line), the display state of the formula bar is in a normal state, which has no sizing bar (state 1) and no scroll bar (state 2).

When the specific content (e.g. the text) placed in the formula bar has exceeded the prescribed range (for example, one line), the aforementioned system for controlling the display size of the formula bar, based on the various data acquired from the aforementioned formula bar module (including the display content, expandable information, scrolling range and the scroll box position of the scroll bar in the formula bar), activates the sub-system I and the sub-system II. The sub-system I, based on the information provided by the system for controlling the display size of the formula bar (including the display content and expandable information), displays a sizing bar and an expand button (state 3) at the lower side of the formula bar, and feeds back this information to the aforementioned system for controlling the display size of the formula bar. The sub-system II, based on the information provided by the main system (including the information on the display content, scrolling range and the scroll box position of the scroll bar), displays a scroll bar and a scroll box (state 4) at the right side of the formula bar, and feeds back this information to the system for controlling the display size of the formula bar. At this time, the formula bar is in a shrank state. Or the sub-system I, based on the information provided by the system for controlling the display size of the formula bar (including the display content and shrink information), displays a sizing bar and a shrinkable button (state 5) at the lower side of the formula bar, and feeds back this information to the system for controlling the display size of the formula bar. The sub-system II, based on the information provided by the main system (including the information on the display content and scrolling range), displays a scroll bar without a scroll box at the right side of the formula bar (state 6), and feeds back this information to the aforementioned system for controlling the display size of the formula bar. At this time, the formula bar is in an expanded state.

When a user is working on the formula bar, the aforementioned system for controlling the display size of the formula bar will record the information on the new data generated by a mouse movement. Then the sub-system I and the sub-system II again acquires new data from the information recorded by the aforementioned system for controlling the display size of the formula bar, and reacts accordingly, e.g., shrinking or expanding the formula bar, or changing the position of the scroll box of the scroll bar, and then feeding back the information to the aforementioned system for controlling the display size of the formula bar.

When applying the aforementioned system for controlling the display size of the formula bar of the present invention, users may voluntarily choose to shrink or expand the formula bar, depending on their current spreadsheet editing needs, thereby making spreadsheet operations much more convenient.

As discussed above, the present invention is directed to information display. More particularly, the invention provides a system and method for changing display size. Merely by way of example, the invention has been applied to displaying content of a cell in a spreadsheet. But it would be recognized that the invention has a much broader range of applicability.

According to yet another embodiment of the present invention, a method for displaying a content associated with a cell in a spreadsheet includes displaying a spreadsheet including at least a cell, receiving a selection of the cell, obtaining information associated with a content for the selected cell, processing information associated with the content, and displaying in a content region the content for the selected cell, the content region being associated with a region size. The content region and the selected cell are related to different physical locations, and the region size is capable of being adjusted by a user. For example, the method is performed according to FIG. 1, and/or implemented according to FIGS. 2, 3, and/or 4. In another example, the content includes at least a formula associated with the selected cell. In yet another example, the content region is a formula region, such as a formula bar. In yet another example, the selection of the cell is performed by a user.

In yet another embodiment, the method also includes receiving the content for the selected cell. The received content is entered by a user. For example, the method is performed according to FIG. 1, and/or implemented according to FIGS. 2, 3, and/or 4. In yet another embodiment, the method also includes receiving from a user information associated with changing the region size, processing the information associated with changing the region size, and adjusting the region size based on at least information associated with changing the region size. For example, the method is performed according to FIG. 1, and/or implemented according to FIGS. 2, 3, and/or 4.

In yet another embodiment, the displaying in a content region the content for the selected cell includes displaying a graphical indication for a user to change the region size for the content region. For example, the method also includes receiving a selection of the graphical indication, changing the region size to a predetermined size in response to the selection of the graphical indication. The selection of the graphical indication is performed by the user. In another example, the displaying a graphical indication includes displaying a button. In yet another example, the method is performed according to FIG. 1, and/or implemented according to FIGS. 2, 3, and/or 4.

In yet another embodiment, the displaying in a content region the content for the selected cell includes displaying a graphical indication for a user to select which part of the content to be displayed in the content region. For example, the displaying in a content region the content for the selected cell also includes displaying a first part of the content in the content region, receiving information associated with an user interaction with the graphical indication, processing information associated with the user interaction with the graphical indication, and displaying a second part of the content in the content region. The first part of the content and the second part of the content can overlap with each other or do not overlap with each other. In another example, the displaying a graphical indication for a user to select which part of the content to be displayed includes displaying a scroll bar, and displaying a scroll box within the scroll bar. In yet another example, the method is performed according to FIG. 1, and/or implemented according to FIGS. 2, 3, and/or 4.

According to yet another embodiment of the present invention, a method for displaying a content associated with a cell in a spreadsheet includes displaying a spreadsheet including at least a cell, receiving a selection of the cell, obtaining information associated with a content for the selected cell, processing information associated with the content, and displaying in a content region the content for the selected cell. The content region is associated with a region size, and the content region and the selected cell are related to different physical locations. The displaying in a content region the content for the selected cell includes determining whether to display a first graphical indication for a user to change the region size for the content region. For example, the method is performed according to FIG. 1, and/or implemented according to FIGS. 2, 3, and/or 4. In another example, the content region is a formula region, such as a formula bar.

In another embodiment, the displaying in a content region the content for the selected cell includes if it is determined to display the first graphical indication, displaying the first graphical indication for the user to change the region size for the content region. For example, the method also includes if it is determined to display the first graphical indication, receiving a selection of the first graphical indication, and changing the region size to a predetermined size in response to the selection of the graphical indication. The selection of the graphical indication is performed by the user. In another example, the displaying a graphical indication comprises displaying a button. In yet another example, the method is performed according to FIG. 1, and/or implemented according to FIGS. 2, 3, and/or 4.

In yet another embodiment, the displaying in a content region the content for the selected cell includes determining whether to display a second graphical indication for a user to select which part of the content to be displayed in the content region, and if it is determined to display the second graphical indication, displaying the second graphical indication. For example, the displaying in a content region the content for the selected cell includes if it is determined to display the second graphical indication, displaying a first part of the content in the content region, receiving information associated with an user interaction with the graphical indication, processing information associated with the user interaction with the graphical indication, and displaying a second part of the content in the content region. In another example, the method is performed according to FIG. 1, and/or implemented according to FIGS. 2, 3, and/or 4.

In yet another embodiment, the method also includes receiving the content for the selected cell, and the received content is entered by a user. For example, the method also includes receiving from a user information associated with changing the region size, processing the information associated with changing the region size, and adjusting the region size based on at least information associated with changing the region size. In another example, the method is performed according to FIG. 1, and/or implemented according to FIGS. 2, 3, and/or 4.

According to yet anther embodiment of the present invention, a computer program product including a computer readable medium including instructions for displaying a content associated with a cell in a spreadsheet. The computer readable medium includes one or more instructions for displaying a spreadsheet including at least a cell, one or more instructions for receiving a selection of the cell, one or more instructions for obtaining information associated with a content for the selected cell, one or more instructions for processing information associated with the content, and one or more instructions for displaying in a content region the content for the selected cell. The content region is associated with a region size. The content region and the selected cell are related to different physical locations, and the region size is capable of being adjusted by a user. For example, the computer program product is implemented according to FIG. 1. In another example, the computer program product performs according to FIGS. 2, 3, and/or 4.

According to yet another embodiment of the present invention, a computer program product including a computer readable medium including instructions for displaying a content associated with a cell in a spreadsheet. The computer readable medium includes one or more instructions for displaying a spreadsheet including at least a cell, one or more instructions for receiving a selection of the cell, one or more instructions for obtaining information associated with a content for the selected cell, one or more instructions for processing information associated with the content, and one or more instructions for displaying in a content region the content for the selected cell. The content region is associated with a region size, and the content region and the selected cell are related to different physical locations. The one or more instructions for displaying in a content region the content for the selected cell include one or more instructions for determining whether to display a first graphical indication for a user to change the region size for the content region. For example, the computer program product is implemented according to FIG. 1. In another example, the computer program product performs according to FIGS. 2, 3, and/or 4.

As discussed above and further emphasized here, FIGS. 1-4 are simplified diagrams according to some embodiments of the present invention. Different diagrams may describe the same embodiment, or different embodiments. Also, these diagram are merely examples, which should not unduly limit the scope of the claims. One of ordinary skill in the art would recognize many variations, alternatives, and modifications. Although the method and/or system have been shown using a selected group of components, there can be many alternatives, modifications, and variations. For example, some of the components may be expanded and/or combined. Other components may be added to those noted above. Depending upon the embodiment, the arrangement of components may be interchanged with others replaced.

In FIG. 1, the application is, for example, a spreadsheet computer program. In another example, the system for controlling the display size of a formula bar is a program module, and the program module includes two program sub-modules. One sub-module is the sub-system I, and the other sub-module is the sub-system II. As discussed above, the system as shown in FIG. 1 can perform some or all processes described in FIGS. 2, 3, and/or 4.

In each of FIGS. 2-4, some or all processes of the method are, for example, performed by a computer or a processor directed by a code. In another example, some or all processes of the method are performed according to instructions included by a computer-readable medium in a computer program product. In yet another example, if content of a cell does not exceed a predetermined range, no graphical indication is displayed for a user to change the size of the region for displaying the content of the cell, such as a formula of the cell. In one embodiment, the region size cannot be changed until the content of the cell exceeds the predetermined range as shown in FIG. 4.

In FIG. 4, for example, size of a region for displaying content of a cell, such as a formula of the cell, can be adjusted by user selecting a button. In one embodiment, the selection of the button enables the user to change the size of the region to one or more various values. For example, some or all of these values are substantially continuous. In another example, some or all of these values are discrete. In another example, for state 3 and/or state 4, the button and the sizing bar overlap completely or partially. In yet another example, state 3 can be executed without state 4 being executed, and/or state 5 can be executed without state 6 being executed. In one embodiment, the sizing bar and/or the button can be displayed without the scroll bar or scroll box.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of controlling a display size of a formula bar in a spreadsheet, the method comprising:

controlling, by a display system, the display size of the formula bar and a formula bar module in parallel in a main window module of a spreadsheet application controlling, by a sub-system I of the display system, the display size of the formula bar by controlling a display state of the formula bar;

controlling, by a sub-system II, a display range of specific contents in the formula bar, wherein said display state comprises a shrink state or an expanded state of the formula bar, and wherein said specific contents comprises the contents currently being edited in the formula bar, and said display range comprises the display range for said specific contents;

continuously executing real-time detecting and measuring of said formula bar module while the application is running;

acquiring data on the size of the formula bar from said formula bar module;

in response to the acquired data exceeding a prescribed range, issuing a command to said formula bar module requesting a change in the size of the formula bar;

in response to issuing said command to said formula bar module requesting said change in the size of the formula bar popping up a sizing bar comprising a shrink button and a expand button which controls said display state in the formula bar and provides a feedback with data on said display state;

based on the data acquired, popping up a scroll bar with a scroll box which may be used for controlling said display range; and providing feedback to the display system for controlling the display size of the formula bar.

2. A method of controlling a display size of a formula bar in a spreadsheet as in claim 1, further comprising:

displaying, by the display system, a spreadsheet including at least a cell;

receiving a selection of the cell;

obtaining information associated with a content for the selected cell;

processing information associated with the content;

displaying in a content region the content for the selected cell, the content region being associated with a region size;

wherein:

the content region and the selected cell are related to different physical locations;

the region size is capable of being adjusted by a user.

3. The method of claim 2 wherein the content includes at least a formula associated with the selected cell.

4. The method of claim 3 wherein the content region is a formula region.

5. The method of claim 4 wherein the formula region is a formula bar.

6. The method of claim 2 wherein the selection of the cell is performed by a user.

7. The method of claim 2, and further comprising receiving the content for the selected cell, the received content being entered by a user.

8. The method of claim 2, and further comprising:

receiving from a user information associated with changing the region size;

processing the information associated with changing the region size;

adjusting the region size based on at least information associated with changing the region size.

9. The method of claim 2 wherein the displaying in a content region the content for the selected cell comprises displaying a graphical indication for a user to change the region size for the content region.

10. The method of claim 9, and further comprising:

receiving a selection of the graphical indication;

changing the region size to a predetermined size in response to the selection of the graphical indication;

wherein the selection of the graphical indication is performed by the user.

11. The method of claim 9 wherein the displaying a graphical indication comprises displaying a button.

12. The method of claim 2 wherein the displaying in a content region the content for the selected cell comprises displaying a graphical indication for a user to select which part of the content to be displayed in the content region.

13. The method of claim 12 wherein:

the displaying in a content region the content for the selected cell further includes:

displaying a first part of the content in the content region;

receiving information associated with an user interaction with the graphical indication;

processing information associated with the user interaction with the graphical indication;

displaying a second part of the content in the content region;

the first part of the content and the second part of the content can overlap with each other or do not overlap with each other.

14. The method of claim 12 wherein the displaying a graphical indication for a user to select which part of the content to be displayed includes:

displaying a scroll bar;

displaying a scroll box within the scroll bar.

* * * * *